United States Patent [19]

Zhao

[11] Patent Number: 5,664,059

[45] Date of Patent: Sep. 2, 1997

[54] SELF-LEARNING SPEAKER ADAPTATION BASED ON SPECTRAL VARIATION SOURCE DECOMPOSITION

[75] Inventor: Yunxin Zhao, Santa Barbara, Calif.

[73] Assignee: Panasonic Technologies, Inc., Princeton, N.J.

[21] Appl. No.: 710,361

[22] Filed: Sep. 16, 1996

Related U.S. Application Data

[63] Continuation of Ser. No. 277,325, Jul. 19, 1994, abandoned, which is a continuation-in-part of Ser. No. 55,075, Apr. 29, 1993, abandoned.

[51] Int. Cl.$^6$ .............................. G10L 5/06; G10L 7/08
[52] U.S. Cl. .................... 701/254; 704/240; 704/242; 704/256
[58] Field of Search .............................. 395/2.49, 2.51, 395/2.54, 2.55, 2.58, 2.59, 2.6, 2.61, 2.63, 2.65

[56] References Cited

U.S. PATENT DOCUMENTS

| | | | |
|---|---|---|---|
| 4,363,102 | 12/1982 | Holmgren et al. | 364/513 |
| 4,903,305 | 2/1990 | Gillick et al. | 395/2.54 |
| 5,033,087 | 7/1991 | Bahl et al. | 395/2.65 |
| 5,165,008 | 11/1992 | Hermansky et al. | 395/2.71 |
| 5,193,142 | 3/1993 | Zhao | 395/2.09 |
| 5,450,523 | 9/1995 | Zhao | 395/2.52 |

OTHER PUBLICATIONS

K.F. Lee, "Large Vocabulary Speaker–Independent Continuous Speech Recognition: the SPHINX System", Doctoral Dissertation, Carnegie Mellon Univ, CMU–CS–88–148, Apr., 1988 pp. 19–41.

S. Furui, "Unsupervised Speaker Adaptation Method Based on Hierarchical Spectral Clustering," Proc. ICASSP pp. 286–289, Glasgow, Scotland, May, 1989.

Y. Zhao et al, "An HMM Based Speaker–Independent Continuous Speech Recognition System w/Experiments on the TIMIT DATABASE", Proc. ICASSP, pp. 333–336, Toronto, Canada, May, 1991.

Kubala, Francis et al. "Speaker Adaptation From a Speaker–Independent Training Corpus," IEEE ICASSP, pp. 137–140, Apr. 1990.

Huang, X.D. and Lee, K.F., "On Speaker–Independent, Speaker–Dependent, and Speaker–Adaptive Speech Recognition," IEEE ICASSP, pp. 877–868, May 1991.

Rozzi, William A. and Stern, Richard M., "Speaker Adaptation in Continuous Speech Recognition Via Estimation of Correlated Mean Vectors," IEEE ICASSP, pp. 865–868, May 1991.

Schmidbauer, O., Tebelskis, J., "An LVQ Based Reference Model for Speaker Adaptive Speech Recognition," IEEE ICASSP, pp. I-441–I444, Mar. 1992.

Furui, Sadaoki, "Unsupervised Speaker Adaptation Method Based on Hierarchical Spectral Clustering," ICASSP, pp. 286–289, May 1989.

Hunt, Melvyn, "Session S. Speech Communication III: Speech Recognition," J. Acoust. Soc. Am. Suppl. 1, vol. 69, Spring 1981, pp. S41–S42.

(List continued on next page.)

*Primary Examiner*—Allen R. MacDonald
*Assistant Examiner*—Tālivaldis Ivars Šmits
*Attorney, Agent, or Firm*—Harness, Dickey & Pierce, P.L.C.

[57] ABSTRACT

A self-learning speaker adaptation method for automatic speech recognition is provided. The method includes building a plurality of Gaussian mixture density phone models for use in recognizing speech. The Gaussian mixture density phone models are used to recognize a first utterance of speech from a given speaker. After the first utterance of speech has been recognized, the recognized first utterance of speech is used to adapt the Gaussian mixture density hone models for use in recognizing a subsequent utterance of speech from that same speaker, whereby the Gaussian mixture density phone models are automatically adapted to that speaker in self-learning fashion to thereby produce a plurality of adapted Gaussian mixture density phone models.

11 Claims, 3 Drawing Sheets

OTHER PUBLICATIONS

Matsumoto, Hiroshi, Wakita, Hisashi, "Vowel Normalization by Frequency Warped Spectral Matching," Elsevier Science Pub. B.V., Speech Communication, vol. 5, 1986, pp. 239–251.

Cox, S.J., Bridle, J.S., "Unsupervised Speaker Adaptation by Probabilistic Spectrum Fitting," ICASSP, pp. 294–297, May 1989.

Cos, S.J., Bridle, J.S. "Simultaneous Speaker Normalization and Utterance Labelling Using Bayesian/Neural Net Techniques," IEEE ICASSP, pp. 161–164, Apr. 1990.

Lee, Chin–Hui et al., "A Study on Speaker Adaptation of Continuous Density HMM Parameters," IEEE ICASSP, pp. 145–148, Apr. 1990.

SELF-LEARNING SPEAKER ADAPTATION BASED ON SPECTRAL VARIATION SOURCE DECOMPOSITION

CROSS-REFERENCE TO RELATED APPLICATION

This is a continuation of U.S. patent application Ser. No. 08/277,325, filed Jul. 19, 1994 abandoned, which is a continuation-in-part of U.S. patent application Ser. No. 08/055,075, filed Apr. 29, 1993 abandoned.

BACKGROUND AND SUMMARY OF THE INVENTION

Speaker-independent continuous speech recognition is ideal for man/machine communication. However, the state-the-art modeling techniques still limit the decoding accuracy of such systems. An inherent difficulty in statistical modeling of speaker-independent continuous speech is that the spectral variations of each phone unit come not only from allophone contextual dependency, but also from the acoustic and phonologic characteristics of individual speakers. These o speaker variation factors make the speaker-independent models less effective than speaker-dependent ones in recognizing individual speakers' speech.

In order to improve speaker-independent continuous speech recognition, it is of great interest to incorporate efficient learning mechanisms into speech recognizers, so that speaker adaptation can be accomplished while a user uses the recognizer and so that decoding accuracy can be gradually improved to that of speaker-independent recognizers.

In the parent application, of which this application is a continuation-in-part, a speaker adaptation technique based on the decomposition of spectral variation sources is disclosed. The technique has achieved significant error reductions for a speaker-independent continuous speech recognition system, where the adaptation requires short calibration speech from both the training and test speakers. The current work extends this adaptation technique into the paradigm of self-learning adaptation, i.e. no adaptation speech is explicitly required from the speaker, and the spectral characteristics of a speaker are learned via statistical methods from the incoming speech utterances of the speaker during his normal usage of the recognizer.

RELATED ART

Reference may be had to the following literature for a more complete understanding of the field to which this invention relates.

S. J. Cox and J. S. Bridle (1989), "Unsupervised Speaker Adaptation by Probabilistic Fitting," Proc. ICASSP, Glasgow, Scotland, May 1989, pp. 294–297.

M. H. Degroot (1970), Optimal Statistical Decisions, (McGraw-Hill Inc.)

A. P. Dempster, N. M. Laird, D. B. Rubin (1977), "Maximum Likelihood Estimation From Incomplete Data Via the EM Algorithm." J. Royal Statistical Society, B 39, No. 1, pp. 1–38.

S. Furui (1989), "Unsupervised Speaker Adaptation Method Based on Hierarchical Spectral Clustering," Proc. ICASSP, Glasgow, Scotland, May 1989, p. 286–289.

H. Hermansky, B. A. Hanson, H. J. Wakita (1985), "Perceptually Based Linear Predictive Analysis of Speech," Proc. ICASSP, Tampa, Fla., March 1985, pp. 509–512.

M. J. Hunt (1981), "Speaker Adaptation for Word Based Speech Recognition Systems," J. Acoust. Soc. Am., 69:S41–S42.

L. F. Lamel, R. H. Kassel, S. Seneff (1986), "Speech Database Development: Design and Analysis of the Acoustic-Phonetic Corpus," Proc. of Speech Recognition Workshop (DARPA).

C.-H. Lee, C.-H. Lin, B.-H. Juang (1990), "A Study on Speaker Adaptation of Continuous Density HMM Parameters," Proc. ICASSP, Minneapolis, Minn., April 1990, pp. 145–148.

C.-H. Lee and Jean-L. Gauvain (1993), "Speaker Adaptation Based on MAP Estimation of HMM Parameters," Proc. ICASSP, Minneapolis, Minn., April 1993, pp. 558–561.

K. Ohkura, M. Sugiyama, S. Sagayama (1992), "Speaker Adaptation Based on Transfer Vector Field Smoothing With Continuous Mixture Density HMMs," Proc. of ICSLP, Banff, Canada, October 1992, pp. 369–372.

D. B. Paul and B. F. Necioglu (1993), "The Lincoln Large-Vocabulary Stack-Decoder HMM CSR," Proc. ICASSP, Vol. II, Minneapolis, Minn., April 1993, pp. 660–664.

K. Shinoda, K. Iso, T. Watanabe (1991), "Speaker Adaptation for Demi-Syllable Based Continuous Density HMM," Proc. of ICASSP, Toronto, Canada, May 1991, pp. 857–860.

Y. Zhao, H. Wakita, X. Zhuang (1991), "An HMM Based Speaker-Independent Continuous Speech Recognition System With Experiments on the TIMIT Database," Proc. ICASSP, Toronto, Canada, May 1991, pp. 333–336.

Y. Zhao (1993a), "A Speaker-Independent Continuous Speech Recognition System Using Continuous Mixture Gaussian Density HMM of Phoneme-Sized Units," IEEE Trans. on Speech and Audio Processing, Vol. 1, No. 3, Jul. 1993 pp. 345–361.

Y. Zhao (1993b), "Self-Learning Speaker Adaptation Based on Spectral Variation Source Decomposition," Proc. EuroSpeech '93, Berlin, Germany, September 1993, pp. 359–362.

DETAILED DESCRIPTION OF THE PREFERRED EMBODIMENTS

Figure 1:
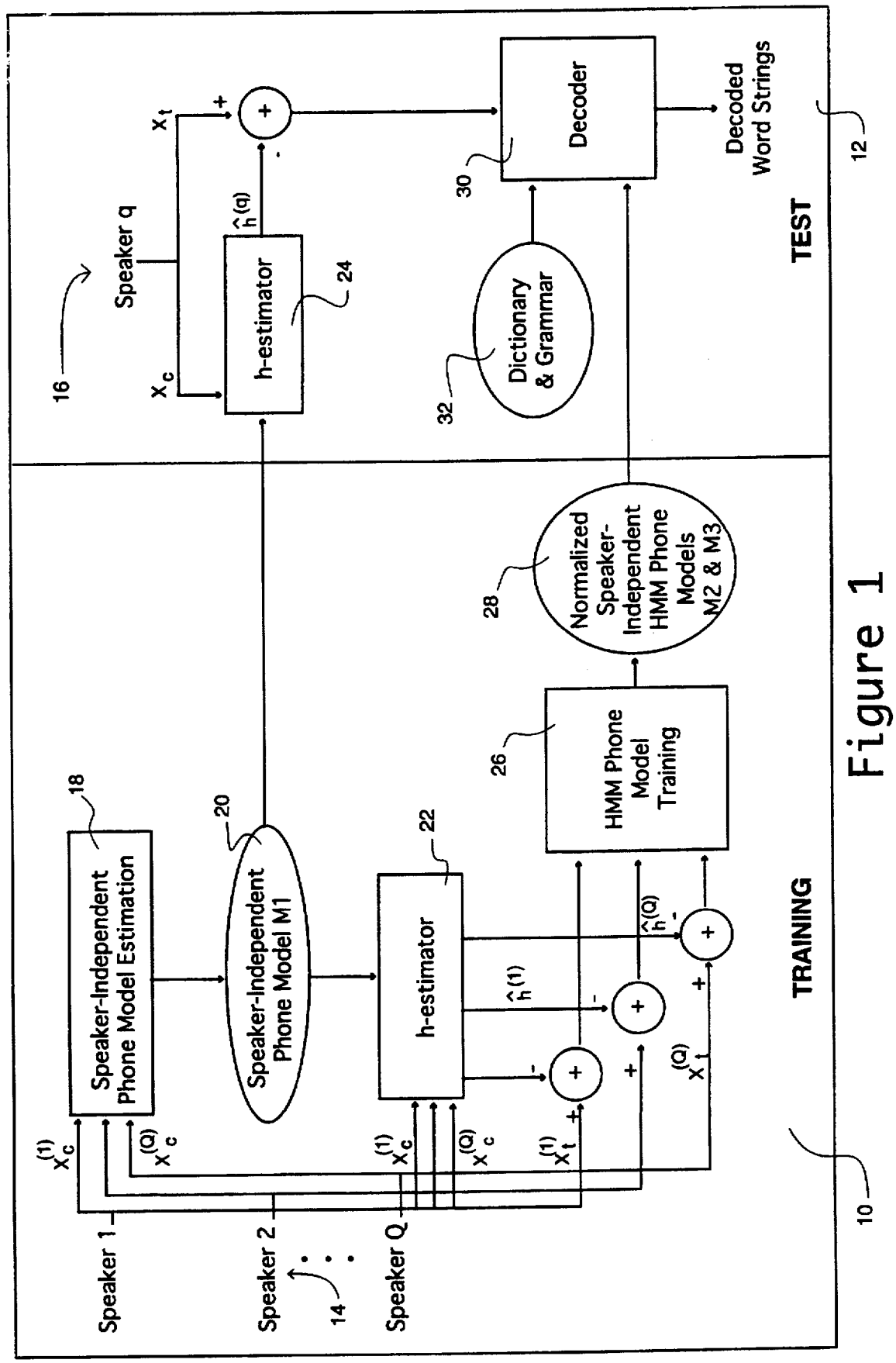
FIG. 1 is a block diagram illustrating how normalization of speaker acoustic characteristics is performed in a system using short calibration speech.
Figure 2:
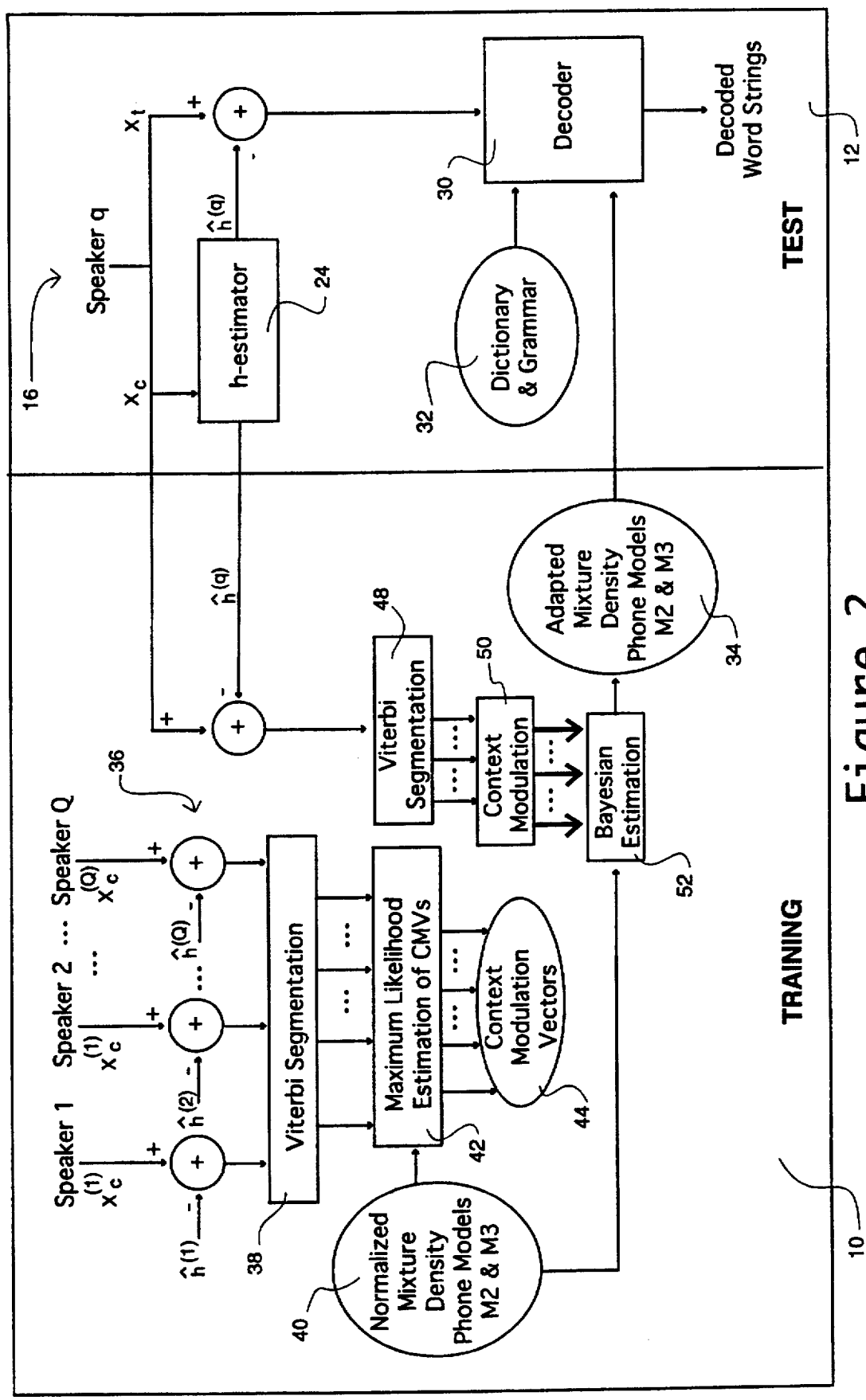
FIG. 2 is a block diagram illustrating how phone model adaptation is performed in the system of FIG. 1.

The speech system of the invention is capable of adapting to the voice characteristics of a given speaker q using only a very short utterance of calibration speech from the speaker. This is made possible by an initial acoustic normalization and subsequent phone model adaptation. FIG. 1 illustrates how normalization of speaker acoustic characteristics is performed. Normalization can also be performed to handle mismatched data acquisition and recording conditions during training and test. FIG. 2 then shows how phone model adaptation is performed. In FIGS. 1 and 2 a distinction is made between the Training phase and the Test phase. Training refers to the procedure by which the speech system is "trained" using a set of known speech data and calibration speech from a plurality of speakers. Test speech refers to the speech produced by individual speaker q when the system is actually used in a speech recognition application. In FIGS. 1 and 2 the Training and Test phases appear in separate boxes, designated Training phase 10 and Test phase 12. In FIGS. 1 and 2 and in the mathematical equations appearing later in this description, calibration speech spectra has been designated $X_c$ whereas test speech spectra has been designated $X_t$. These spectra are in the logarithmic domain. FIGS. 1 and 2 are intended to give an overview of the system. Complete implementation details are discussed later in conjunction with the mathematical equations.

Referring to FIG. 1, the system is first calibrated by supplying calibration speech from a plurality of speakers. This is designated at 14 where the speech from speaker 1 . . . speaker Q are input. The capital letter Q on the left-hand side of the figure denotes the total number of training speakers. The lower case q on the right-hand side of the figure denotes a specific test speaker. Speaker q appears at 16 in FIG. 1.

The calibration speech spectra $X_c$, representing specific Calibration sentences, are supplied to a speaker-independent phone model estimation process 18 which produces a set of speaker-independent phone models M1, illustrated in oval 20. M1 has a set of unimodal Gaussian densities, in which there is a single Gaussian density for each state of each phone unit. M1 is then supplied to a process which estimates a spectral bias for a speaker as a function of his or her calibration speech. This is illustrated in h-estimator block 22 and also h-estimator block 24. Both h-estimator blocks are constructed essentially in the same way. They produce the estimated spectral bias parameter vector $\hat{h}$, a factor which is subtracted from the speech spectra in the logarithmic domain to produce normalized spectra. The equations for obtaining this estimated spectral bias are set forth as implementation details below.

On the Training side (box 10) the estimated spectral bias $\hat{h}$ for each of the training speakers is subtracted from the speaker's training speech spectra $X_t$ in the logarithmic domain to produce a set of normalized spectra which is then modeled using a Hidden Markov model (HMM) at process 26. This results in production of normalized speaker-independent HMM phone models M2 and M3, illustrated at 28. Model set M2 is a set of Gaussian mixture density phone models; M3 is a set of unimodel Gaussian density phone models. The normalized phone models M2 and M3 are then supplied to the decoder 30 for use in decoding the test speech of speaker q. The training speech spectra $X_t$ is obtained using different sentences than those used to obtain the calibration spectra $X_c$.

Before speaker q uses the system to recognize sentences, a short utterance of calibration speech $X_c$ is first supplied to h-estimator 24 to produce an estimated spectral bias $\hat{h}^{(q)}$ for that speaker. This $\hat{h}^{(q)}$ is subtracted from the test speech spectra $X_t$ when the speaker q enters further speech after calibration. As before, the estimated spectral bias parameter is subtracted in the logarithmic domain resulting in acoustically normalized spectra. This normalized spectra then fed to decoder 30 which constructs decoded word strings using a dictionary and grammar 32, and the HMM phone models 28.

To further improve performance, the system may also perform phone model adaptation on M2 and M3. The technique for doing this is illustrated in FIG. 2. In FIG. 2 the adapted mixture density phone models M2 and M3 are shown in oval 34. As in FIG. 1, FIG. 2 also divides its functionality into a training phase 10 and a test phase 12. Test phase 12 is essentially the same as described for FIG. 1, with the exception that the decoder 30 is supplied with adapted mixture density phone models M2 and M3. Since the processes of phase 12 of FIG. 2 are essentially the same as those of phase 12 of FIG. 1, they will not be further described here. The focus for review of FIG. 2 will be on phase 10 where the phone model adaptation process takes place.

The calibration spectra $X_c$ for the plurality of training speakers (Speaker 1, . . . Speaker Q) are normalized by subtracting the estimated spectral bias parameters in the logarithmic domain as indicated at 36. This is accomplished, for example, using the $\hat{h}$ parameters produced by h-estimator 22 of FIG. 1.

Next, a Viterbi segmentation process is performed on the data at 38, thus segmenting the data into phone units of defined boundaries. The Viterbi segmentation process is performed using normalized mixture density phone models M2 and M3. These models M2 and M3, illustrated by oval 40 in FIG. 2, may be the same models as those depicted by oval 28 in FIG. 1, that is produced after acoustic normalization.

Once Viterbi segmentation has been performed, the individual phone units are used to determine context modulation vectors (CMV) by a maximum likelihood estimation process depicted generally at 42. The resultant context modulation vectors are depicted by oval 44. These context modulation vectors are derived from the calibration speech $X_c$ and the training speech $X_t$ of the training speakers (Speaker 1, . . . Speaker Q).

The calibration speech $X_c$ for the test speaker, Speaker q, is normalized by subtracting the estimated spectral bias at 46. Thereafter Viterbi segmentation is performed at 48 to segment the normalized spectra of speaker q into allophone subsegments. The spectra of the allophone subsegments are then context modulated at 50, using the previously derived context modulation vectors 44. These context modulated spectra are then used in a Bayesian estimation process 52. The Bayesian estimation operates on the normalized mixture density phone models M2 and M3, shown in oval 40, to produce the adapted mixture density phone models M2 and M3, shown in oval 34. The adapted mixture density phone models are thus tuned to the individual speaker q without requiring speaker q to speak any further adaptation speech.

Figure 3:
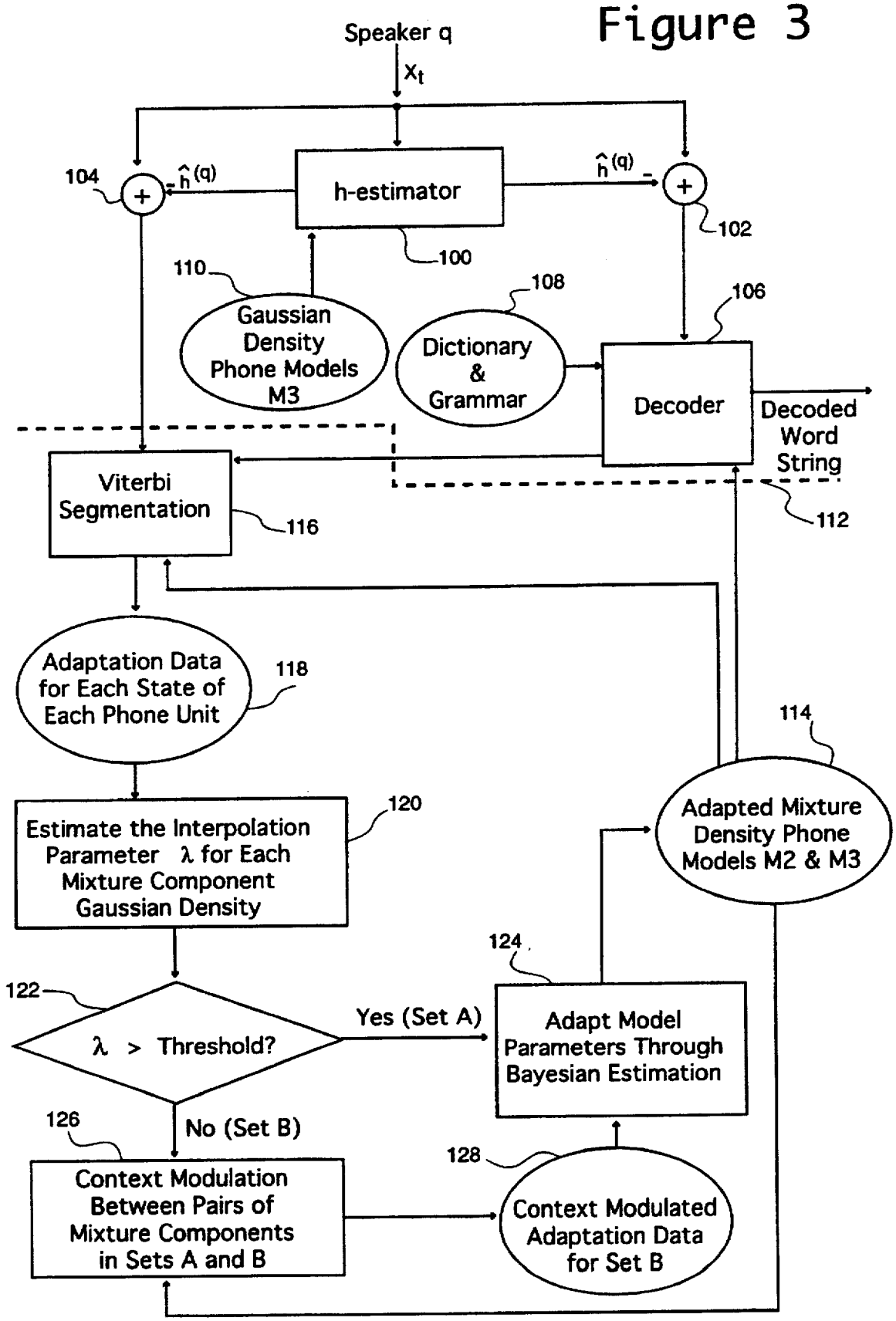
FIG. 3 is a block diagram illustrating the presently preferred embodiment of a self-learning speaker-independent, continuous speech recognition system according to the invention.

Having described a system for speaker adaptation using very short calibration speech, we turn now to a system which is self-learning. Referring to FIG. 3, the speech spectra of speaker q is acoustically normalized by subtracting out an estimated spectral bias $\hat{h}^{(q)}$. In this case, the input speech spectra $X_t$ represents actual test speech, that is, speech to be decoded by the recOgnizer, as opposed to calibration speech. As previously noted test speech is designated $X_t$ and calibration speech is designated $X_c$.

The actual acoustic normalization is performed by first generating the estimated spectral bias $\hat{h}^{(q)}$. This is done by h-estimator block 100, which calculates the estimated spectral bias $\hat{h}^{(q)}$ from $X_t$ and the Gaussian density phone model set M3. This calculation is further described in equation (3) below. Because the speech spectra $X_t$ is in the logarithmic spectral domain, the estimated spectral bias is removed from the speech spectra by subtraction. This is illustrated at 102 and 104 in FIG. 3. The Gaussian density phone models M3 used by h-estimator 100 are depicted at 110.

The normalized spectra resulting from the subtraction operation 102 are supplied to the decoder 106 which produces the decoded word string, namely a text string representing the recognized speech using dictionary and grammar 108 and the adapted Guassian mixture density phone models M2 and M3, 114.

As further explained below, the self-learning ability involves performing phone model adaptation after each sentence is decoded. In FIG. 3, a dotted line 112 has been drawn to visually separate the procedures performed after sentence decoding (below) from the decoding procedures themselves (above). Note that the decoder 106 uses the adapted mixture density phone models M2 and M3, shown in oval 114. As will be seen, these models M2 and M3 are adapted, in self-learning fashion, after each sentence is decoded. Thus the adapted mixture density phone models M2 and M3 are depicted below dotted line 112.

The phone model adaptation process begins with Viterbi segmentation 116. The decoded word strings from decoder 106 and the adapted mixture density phone models 114 are supplied to the Viterbi segmentation block. The Viterbi segmentation process is performed on the acoustic normalized spectra resulting from the subtraction process 104. In layman's terms, Viterbi segmentation segments a sequence of speech spectra into segments of phone units which are the physical units of actual speech that correspond to phonemes. (Phonemes are the smallest speech units from a linguistic or phonemic point of view. Phonemes are combined to form syllables, syllables to form words and words to form sentences.)

The Viterbi segmentation process 116 produces adaptation data for each state of each phone unit. This is symbolized in oval 118. The output of decoder 106 is supplied to the Viterbi segmentation process because, in this case, the Viterbi segmentation process is not dealing with known strings of calibration data.

In step 120 an interpolation parameter $\lambda$ is estimated for each mixture component Gaussian density from the adaptation data. The interpolation parameter is used at step 122 to determine whether there is enough data to adapt the corresponding component Gaussian density in a mixture density for a state of a phone unit in the model sets M2 and M3 illustrated in oval 114. If the data is sufficient, the mixture component is categorized as belonging to Set A and the data is used to adapt the parameters of the mixture component by Bayesian estimation. This is shown at step 124. This adaptation process corresponds to equations (9) and (10) in the mathematical description below.

In some cases, particularly when speaker q first starts using the system, the amount of speech data may be insufficient for adapting certain mixture component Gaussian densities of models 114. This condition is detected at step 122 where the interpolation parameter $\lambda$ is below the threshold, and the corresponding mixture component Gaussian density is categorized as belonging to Set B. In this case, context modulation is performed at step 126 on the data of the state of the phone unit for adapting the parameters of the mixture component density, where the parameters of context modulation have been estimated between sets A and B. Context modulation supplements the adaptation data by producing context-modulated adaptation data for mixture components in set B. This is illustrated in oval 128. The context-modulated data are then used in step 124 to adapt the parameters of component Gaussian densities in set B through Bayesian estimation.

As a result of Bayesian estimation the adapted mixture density phone models M2 and M3 are developed. Note that these models are fed back to the Viterbi segmentation process 116, so that future Viterbi segmentation can take advantage of the adapted mixture density phone models thus produced. In layman's terms, the adapted mixture density phone models are modified so that they better match the speech characteristics of the individual speaker q. Context modulation is used in step 126 to "fill in the gaps" in the data set, should the data set be insufficient for direct adaptation in step 124. Context modulation takes into account that the component Gaussian densities in an acoustically normalized mixture density of a state of a given phone unit mainly models the context dependencies of allophones, where the pronunciation of a phone unit is pronounced differently, depending on the neighboring phone units. Through context modulation, the adaptation data of a phone unit from different context of neighboring phones can be used to adapt the parameters of a specific component Gaussian density which models the allophone spectra of certain similar contexts.

Implementation Details

The speaker-induced spectral variation sources are decomposed into two categories, one acoustic and the other phone specific. The acoustic source is attributed to speakers' physical individualities which cause spectral variations independent of phone units; the phone-specific source is attributed to speakers' idiosyncrasies which cause phone-dependent spectral variations; each variation source is modeled by a linear transformation system. Spectral biases from the acoustic variation source are estimated using unsupervised maximum likelihood estimation proposed by Cox et al. for speaker adaptation in isolated vowel and word recognition (Cox et al. 1989).

Acoustic normalization is performed by removing such spectral variations from the speech spectra of individual speakers. The phone-specific spectral variations are handled by phone model adaptation, where the parameters of speaker-independent Gaussian mixture density phone models are adapted via Bayesian estimation. The derivations for the unsupervised maximum likelihood estimation of spectral bias and Bayesian estimation of Gaussian mixture density parameters are both cast in the mathematical framework of the EM algorithm (Dempster et al. 1977).

The baseline speaker-independent continuous speech recognition system is based on hidden Markov models of phone units: each phone model has three tied-states, and each state is modeled by a Gaussian mixture density. For enhancing adaptation effect when the adaptation data is limited, context dependency of allophones are modeled by context modulation between pairs of mixture components within each Gaussian mixture density (Zhao, 1993b). The proposed adaptation technique is shown effective in improving the recognition accuracy of the baseline speaker independent continuous speech recognition system which was trained from the TIMIT database (Lamel et al. 1986). The evaluation experiments are performed on a subset of the TIMIT database and on speech data collected in our laboratory.

This description of implementation details is presented in six sections, including a general description of the self-learning adaptation method, a detailed description of the statistical methods for acoustic normalization and phone model adaptation, experimental results and a summary.

Self-Learning Adaptation

The acoustic and phone-specific variation sources are modeled as two cascaded linear transformations on the spectra of a standard speaker. Considering a speaker q, let $H^{(q)}$ and $L_i^{(q)}$ be the linear transformations representing the acoustic and the ith phone-specific sources, respectively, for $i=1, 2, \ldots, M$. Let $X_{i,t}^{(q)}$ and $X_{i,t}^{(o)}$ be a pair of spectra of phone unit i at time t from the speaker q and the standard speaker o. The composite mapping from the two linear transformations is then $$X_{i,t}^{(q)} = H^{(q)} L_i^{(q)} X_{i,t}^{(o)}, \forall i,t \qquad (1)$$

In the logarithmic spectral domain, using lower case variables, the multiplicative mappings become additive biases, i.e.

$$x_{i,t}^{(q)} = h^{(q)} + l_i^{(q)} + x_{i,t}^{(o)}, \forall i,t \qquad (2)$$

In the present adaptation technique, the acoustic bias $h^{(q)}$ is explicitly estimated, whereas the phone-specific bias $l_i^{(q)}$'s are handled implicitly via the adaptation of phone model parameters. The subtraction of $h^{(q)}$ from $x_{i,t}^{(q)}$ is called acoustic normalization, yielding the acoustically normalized spectra $\tilde{x}_{i,t}^{(q)} = x_{i,t}^{(q)} - h^{(q)}$, $\forall i,t$. In the case that an unmatched recording condition introduces a linear transformation distortion D, this distortion in the logarithmic domain, d, is absorbed by the bias vector $\tilde{h}^{(q)} = h^{(q)} + d$.

The baseline recognition system uses both instantaneous and dynamic spectral features (Zhao 1993a). As can be observed from Equation (2), dynamic spectral features are not affected by the spectral bias $h^{(q)}$ due to the inherent spectral difference computation in their extraction. The dynamic features, on the other hand, could be affected by the phone-specific bias $l_i^{(q)}$'s at the boundaries of phone units. Presently, only the instantaneous spectral features and their models are considered for adaptation. This separate treatment of the instantaneous and dynamic spectral models is facilitated by the block-diagonal covariance structure defined for the Gaussian mixture density phone models (Zhao, 1993a), one block for instantaneous features, and the other for dynamic features. For more details, see the work by Zhao (Zhao, 1993a).

Assuming a speaker speaks one sentence at a time during the course of using the recognizer, then for each input sentence, speaker adaptation is implemented in two sequential steps. Referring to FIG. 3, the first step is carried out before recognizing the sentence, where the spectral bias of the speaker's acoustic characteristics is estimated from the spectra of the current sentence and the speech spectra of the same sentence are subsequently normalized. The second step is carried out after recognizing the sentence, where the parameters of phone models are adapted using Bayesian estimation. In the second step, the adaptation data for each phone unit is prepared via Viterbi segmentation of the spectral sequence of the recognized sentence, and the segmentation is supervised by the recognized word string. The adapted phone models are then used to recognize the next sentence utterance from the speaker.

Speaker Normalization

Assuming the phone model parameters of the standard speaker are estimated from the speech data of speakers in the training set, the phone models are unimodal Gaussian densities $N(\mu_i, C_i)$, i=1, 2, ... M. For a speaker q, a sentence utterance consists of the spectral sequence $x^{(q)} = \{x_t^{(q)}, t=1, ..., T^{(q)}\}$. In the context of the EM algorithm the spectral vector $x_t^{(q)}$'s are called the observable data, and their phone label $i_t$'s are the unobservable data. The complete data set consists of both the observable and unobservable data ($x_1^{(q)}, x_x^{(q)}, ..., x_T^{(q)}, i_1, i_2, ..., i_T$). Using upper case variables $X^{(q)}$ and I to denote the random variables for the observable and unobservable data, respectively, the estimation of $h^{(q)}$ is made through the iterative maximization of the expected value of the conditional log likelihood of the complete data. Assuming an initial value $\hat{h}_0^{(q)}$, the iterative estimation formula is then:

$$\hat{h}_{n+1}^{(q)} = \arg\max_{h^{(q)}} E_{\hat{h}_n^{(q)}} [\log f(X^{(q)}, I|h^{(q)})|X^{(q)} = x^{(q)}] = \qquad (3)$$

$$\arg\max_{h^{(q)}} \sum_{t=1}^{T^{(q)}} \sum_{i=1}^{M} P(i_t = i|x_t, \hat{h}_n^{(q)}) \log f(x_t^{(q)}, i_t = i,|h^{(q)}) =$$

$$\arg\max_{h^{(q)}} \sum_{t=1}^{T^{(q)}} \sum_{i=1}^{M} P(i_t = i|x_t, \hat{h}_n^{(q)}) \log f(x_t^{(q)}|i_t = i, h^{(q)}) P(i_t = i)$$

where $$P(i_t = i|x_t^{(q)}, \hat{h}_n^{(q)}) = \frac{f(x_t^{(q)} | i_t = i, \hat{h}_n^{(q)}) P(i_t = i)}{\sum_{i=1}^{M} f(x_t^{(q)} | i_t = i, \hat{h}_n^{(q)}) P(i_t = i)} \qquad (4)$$

$$f(x_t^{(q)} | i_t = i, h^{(q)}) \sim N(\mu_i + h^{(q)}, C_i)$$
$$P(i_t = i) \sim \text{uniform}$$

If the posterior probability $P(i_t=i|x_t^{(q)}, \hat{h}_n^{(q)})$'s are each approximated by the decision operation $$i_n^*(t) = \arg\max_i P(i_t^{(q)}, \hat{h}_n^{(q)})$$

and the covariance matrices of the Gaussian densities are taken as the unit matrix, the estimated spectral bias $\hat{h}^{(q)}$ becomes simply the average spectral deviations between the sentence spectra and the corresponding mean vectors of the labeled phone models, i.e.

$$\hat{h}_{n+1}^{(q)} = \frac{1}{T^{(q)}} \sum_{t=1}^{T^{(q)}} (x_t^{(q)} - \mu_{i_n^*(t)}) \qquad (5)$$

In this study, Equation (5) is used for estimation of spectral biases and the initial condition is set as $\hat{h}_0^{(q)} = 0$.

It is advantageous to perform acoustic normalization on both training and test data, where removing spectral biases from training spectra makes the phone models more efficient in capturing statistical variations of allophones. To construct phone models characterizing a standard speaker, the training data are first used to estimate a set of unimodal Gaussian density phone models. Using these models as reference, a spectral bias vector is estimated for each sentence utterance from each speaker, and the estimated spectral bias is subsequently removed from the sentence spectra. Gaussian mixture density phone models are trained from the acoustically normalized training data.

An alternative method of estimating a spectral bias for each speaker is to iteratively update the estimate as more data from the speaker become available. Although in general using more data produces more reliable estimates, it has been observed in the experiments that the iterative estimation scheme became sluggish in keeping up with random changes in a speaker's voice characteristic, and in this instance it led to inferior recognition results.

Phone Model Adaptation

For phone model adaptation, the acoustically normalized speech spectra are segmented into states of phone units according to the recognized word sequence. For each state of phone unit, the parameters of the Gaussian mixture density are adapted via Bayesian estimation (Lee, 1990; Lee, 1993). In order to enhance the effect of adaptation when the amount of adaptation data is limited, context modulation (Zhao, 1993b) is employed for adapting the Gaussian component densities which have insufficient adaptation data.

Bayesian Estimation of Gaussian Mixture Density Parameters

Considering a size-M Guassian mixture density, the mean vectors and covariance matrices of the component densities are denoted $\theta_i=(\mu_i, C_i)$, $\forall i$. The mixture weights are $\alpha_i \geq 0$, $\forall i$ and $$\sum_{i=1}^{M}$$

$\alpha_i=1$. Denoting $\Theta=\{\theta_1,\theta_2,\ldots,\theta_M\}$ and $A=\{\alpha_1,\alpha_2,\ldots,\alpha_M\}$, the likelihood or a feature vector $x_t$ (the notation $\tilde{x}_t^{(q)}$ is dropped for simplicity of derivation and the feature dimension is assumed as L) is computed as:

$$f(x_t|\Theta,A) = \sum_{i=1}^{M} \alpha_i f(x_t|\theta_i) \quad (6)$$

with $f(x_t|\theta_i) \sim N(\mu_i, C_i)$, $\forall i$. The prior distributions of $\theta_i$, $i=1, 2, \ldots, M$ are assumed to be independent, and the mixture weights $\alpha_i$'s are taken as constant. The prior mean and covariance $\mu_o^{(i)}$ and $C_o^{(i)}$ are the speaker-independent estimates from a training sample size $N_i$, $\forall i$. Defining the precision matrix $r_i = C_i^{-1}$, the joint distribution of mean and precision matrix $(\mu_i, r_i)$ is taken as a conjugate prior distribution (Degroot, 1970). Specifically, the conditional distribution of $\mu_i$ given $r_i$ is Gaussian with mean $\mu_o^{(i)}$ and precision matrix $\nu r_i$, $\nu$ being a scaling constant, and the marginal distribution of $r_i$ is a Wishart distribution with $\rho$ degree of freedom and a scaling matrix $\tau_i = N_i C_o^{(i)}$, i.e.

$$p(\mu_i,r_i) \propto |r_i|^{1/2} \exp\left(-\frac{1}{2} tr(\nu r_i(\mu_i-\mu_o^{(i)})(\mu_i-\mu_o^{(i)})')\right) \times |r_i|^{(\rho-L-1)/2} \exp\left(-\frac{1}{2} tr(\tau_i r_i)\right) \quad (7)$$

where $\propto$ signifies "proportional to." Since the prior mean and covariance are estimated from $N_i$ data samples, the precision scale $\nu$ and the degree of freedom $\rho$ are both assigned the value of training sample size $N_i$ (Degroot, 1970).

There is a set of observable feature data $x=\{x_1,x_2,\ldots,x_T\}$ and a set of unobservable data $\{i_1, i_2, \ldots, i_T\}$, $i_t$ being the mixture index for $x_t$, $\forall t$. The estimation of $\Theta$ is, therefore, again formulated in the framework of the EM algorithm. The difference to the EM formulation previously referenced is that the conditional expectation is taken with respect to the posterior likelihood of the complete data set (X,I), i.e.

$$\hat{\Theta}^{(n+1)} = \arg\max_{\Theta} E_{\hat{\Theta}^{(n)}}[\log f(\Theta|X,I,A)|X=x] = \quad (8)$$

$$\arg\max_{\Theta} E_{\hat{\Theta}^{(n)}}[\log(f(X,I|\Theta,A)p(\Theta))|X=x] =$$

$$\arg\max_{\Theta} \left\{ \sum_{t=1}^{T}\sum_{i=1}^{M} P(i_t=i|x_t, \hat{\theta}_i^{(n)})\log f(x_t, i_t=i|\theta_i) + \sum_{i=1}^{M} \log p(\theta_i) \right\}$$

The initial $\hat{\Theta}^{(0)}$ are speaker-independent model parameters. The maximization of the expectation is decoupled for individual $\theta_i$'s and leads to the posterior estimate of mean $$\hat{\mu}_i^{(n+1)} = (1-\lambda_i^{(n)})\mu_o^{(i)} + \lambda_i^{(n)}\mu_x^{(i)(n)} \quad (9)$$

and covariance (with approximation $\rho - L = N_i$)

$$\hat{C}_i^{(n+1)} = (1-\lambda_i^{(n)})C_o^{(i)} + \lambda_i^{(n)}C_x^{(i)(n)} + \lambda_i^{(n)}(1-\lambda_i^{(n)})(\mu_x^{(i)(n)} - \mu_o^{(i)})(\mu_x^{(i)(n)} - \mu_o^{(i)})' \quad (10)$$

where $\lambda_i^{(n)}$ is the interpolation parameter, $\mu_x^{(i)(n)}$ and $C_x^{(i)(n)}$ are sample mean and covariance of the adaptation data. Denoting the posterior probability $P(i_t=i|x_t,\theta_i^{(n)})$ by $\gamma_{t,i}^{(n)}$, i.e., $$\gamma_{t,i}^{(n)} = \alpha_i f(x_t|\theta_i^{(n)}) / \sum_{j=1}^{M} \alpha_j f(x_t|\theta_j^{(n)}) \quad (11)$$

parameters $\lambda_i^{(n)}$, $\mu_x^{(i)(n)}$ and $C_x^{(i)(n)}$ are computed as $$\lambda_i^{(n)} = \sum_{t=1}^{T} \gamma_{t,i}^{(n)} / \left(\sum_{t=1}^{T} \gamma_{t,i}^{(n)} + N_i\right) \quad (12)$$

$$\mu_x^{(i)(n)} = \sum_{t=1}^{T} \gamma_{t,i}^{(n)} x_t / \sum_{t=1}^{T} \gamma_{t,i}^{(n)}$$

$$C_x^{(i)(n)} = \sum_{t=1}^{T} \gamma_{t,i}^{(n)} (x_t - \mu_x^{(i)(n)})(x_t - \mu_x^{(i)(n)})' / \sum_{t=1}^{T} \gamma_{t,i}^{(n)}$$

Enhancement of Adaptation Effect

When a user initially starts using a recognizer, the amount of feedback adaptation data is limited and most mixture components have only a small amount or no adaptation data. In this scenario, the Gaussian component densities lacking adaptation data are adapted using context-modulated data. In the logarithmic domain, the relation between spectra of two allophones a and b is, $x_{a,t} = x_{b,t} + \xi$ with $\xi$ a context modulation vector (CMV). When each Gaussian component density in a mixture is conceptualized as modeling spectra of a generalized allophone context, a CMV can be estimated between each pair of mixture components using the respective training data. Denoting the mapping of training spectra in the ith mixture component, $X_t$, $\forall t$ to the jth mixture component by $c_{i,j}(x_t)=x_t+\xi_{i,j}$, the CMV $\xi_{i,j}$ is estimated by maximizing the joint likelihood of $c_{i,j}(x_t)$, $\forall t$, under the Gaussian density model $\theta_j=(\mu_j, C_j)$, i.e.

$$\hat{\xi}_{i,j} = \arg\max_{\xi_{i,j}} \sum_{t=1}^{T} \log f(c_{i,j}(x_t)|\theta_j) \quad (13)$$

It is straightforward to derive that the estimate is $\hat{\xi}_{i,j}=\mu_j-\mu_i$, which is the difference between the mean vectors of the jth and ith component Gaussian densities.

Based on the CMVs, the adaptation data clustered to individual Gaussian component densities in a mixture can be mapped to a specific component density for adapting its parameters. There are two potential problems with this method. First, the component densities in a mixture are spaced apart by different distances. The linear transformation model of context modulation could be inappropriate for component density pairs which are separated by large distances. Second, after a speaker uses a recognizer for an extended period of time, the amount of adaptation data in a state of a phone unit could become large, and using all these data for adapting a specific Gaussian component density might lead to over-adaptation. In the following, two cases are considered. In the first case, the context-modulated adaptation data are straightforwardly used to adapt the parameters of a specific Gaussian component density. In the second case, constraints on adaptation are introduced by applying weights and threshold to the first case to handle the above-mentioned two potential problems.

Unconstrained Adaptation

The interpolation parameter $\lambda_i$ defined in Equation (12) measures the amount of adaptation data for the ith mixture component, $\forall i$. Taking a threshold $\eta<1$, a decision is made that if $\lambda_i \geq \eta$, the parameters of the ith mixture component are directly adapted using Equations (9) and (10), otherwise the parameters are adapted using the context-modulated data. Assuming the jth mixture component has insufficient adaptation data, i.e., $\lambda_j<\eta$, the model parameters $\theta_j=(\mu_j, C_j)$ can also be estimated from an EM formulation. Denote the mapping of adaptation data $x=\{x_1, x_2, \ldots, x_T\}$ from the individual Gaussian component densities to the jth mixture component by $C_j(x)$, then $$\hat{\theta}_j^{(n+1)} = \arg\max_{\theta_j} E_{\Theta(n)} [\log f(\theta_j|C_j(X))|X=x] \quad (14)$$

$$= \arg\max_{\theta_j} \left\{ \sum_{t=1}^{T} \sum_{i=1}^{M} \gamma_{t,i}^{(n)} \log f(c_{ij}(x_t)|\theta_j) + \log p(\theta_j) \right\}$$

Further define the weighting coefficients (note the use of the constant $$\sum_{i=1}^{M} \gamma_{t,i}^{(n)} = 1)$$

$$\beta_i^{(j)(n)} = \sum_{t=1}^{T} \gamma_{t,i}^{(n)} / \left( N_j + \sum_{i'=1}^{M} \sum_{t=1}^{T} \gamma_{t,i'}^{(n)} \right) \quad (15)$$

$$= \sum_{t=1}^{T} \gamma_{t,i}^{(n)}/(N_j+T), \quad i=1,\ldots,M.$$

The posterior estimate of mean $\hat{\mu}_j^{(n+1)}$ is derived as $$\hat{\mu}_j^{(n+1)} = \left(1 - \sum_{i=1}^{M} \beta_i^{(j)(n)}\right) \mu_o^{(j)} + \sum_{i=1}^{M} \beta_i^{(j)(n)}(\mu_x^{(i)(n)} + \mu_o^{(j)} - \mu_o^{(i)}) \quad (16)$$

$$= \mu_o^{(j)} + \sum_{i=1}^{M} \beta_i^{(j)(n)}(\mu_x^{(i)(n)} - \mu_o^{(i)}).$$

As seen from Equation (16), the sum of the weighting coefficients $$\sum_{i=1}^{M} \beta_i^{(j)(n)}$$

serves as an interpolation parameter, and the estimate $\hat{\mu}_j^{(n+1)}$ is the shift of the original mean $\mu_o^{(j)}$ by the vector $$\delta^{(j)(n)} = \sum_{i=1}^{M} \beta_i^{(j)(n)}(\mu_x^{(i)(n)} - \mu_o^{(i)}).$$

Making use of the vector $\delta^{(j)(n)}$, the posterior estimate of covariance matrix is derived as $$\hat{C}_j^{(n+1)} = \left(1 - \sum_{i=1}^{M} \beta_i^{(j)(n)}\right)(C_o^{(j)} + \delta^{(j)(n)}\delta^{(j)(n)\prime}) + \quad (17)$$

$$\sum_{i=1}^{M} \beta_i^{(j)(n)}(C_x^{(i)(n)} + (\delta^{(j)(n)} + \mu_o^{(j)} - \mu_x^{(i)(n)})(\delta^{(j)(n)} + \mu_o^{(j)} - \mu_x^{(i)(n)})')$$

Constrained Adaptation

For taking into account the distances between Gaussian component density pairs, the EM formulation of Equation (14) is modified to weigh the likelihood of each feature vector by a factor less than or equal to one, i.e.

$$\hat{\theta}_j^{(n+1)} = \arg\max_{\theta_j} \left\{ \sum_{t=1}^{T} \sum_{i=1}^{M} \gamma_{t,i}^{(n)} \log f(c_{ij}(x_t)|\theta_j) v_{j,i} + \log p(\theta_j) \right\} \quad (18)$$

where the factor $v_{j,i}$ is an inverse function of the Euclidean distance $d_{i,j}=\|\mu_i-\mu_j\|$ and is defined as $$v_{j,i} = \begin{cases} 1 & j=i \\ \dfrac{\min_{i'} \sum_{k=1, k\neq j}^{M} (d_{i',k}/d_{k,j})}{\sum_{k=1, k\neq j}^{M} (d_{i,k}/d_{k,j})} & j \neq i \end{cases} \quad (19)$$

In equation (19), the numerator in the case $j\neq i$ is for normalizing the largest value of $v_{j,i}$ to one, i.e.

$$\max_{i} v_{j,i} = 1 (i \neq j).$$

The purpose of the normalization is for achieving a larger adaptation effect than without the normalization. It is easy to derive that the estimation formulas for $\hat{\mu}_j^{(n+1)}$ and $\hat{C}_j^{(n+1)}$ remain in the same form as in Equations (16) and (17), but the coefficient $\beta_i^{(j)(n)}$'s are changed to $$\beta_i^{(j)(n)} = \sum_{t=1}^{T} v_{j,i}\gamma_{t,i}^{(n)} / \left( N_j + \sum_{i'=1}^{M} \sum_{t=1}^{T} v_{j,i'}\gamma_{t,i'}^{(n)} \right) \quad (20)$$

To avoid over-adaptation the value of $$\sum_{i=1}^{M} \beta_i^{(j)(n)}$$

is checked against a threshold $\epsilon<1$. If $$\sum_{i=1}^{M} \beta_i^{(j)(n)} > \epsilon,$$

the weighting factor is modified to $\xi_i v_{j,i}$ where $\xi_i=1$ for $i=j$, otherwise $\xi_i=\xi<1$, $\forall i$. The value $\xi$ is determined by setting $$\sum_{i=1}^{M} \beta_i^{(j)(n)} = \epsilon,$$

which leads to $$\xi = (\epsilon - \beta_j^{(j)(n)})\left(N_j + \sum_{t=1}^{T} \gamma_{t,j}^{(n)}\right) / \left\{ (1-(\epsilon-\beta_j^{(j)(n)})) \sum_{i=1, i\neq j}^{M} \sum_{t=1}^{T} v_{j,i}\gamma_{t,i}^{(n)} \right\} \quad (21)$$

EXPERIMENTS

Experiments were performed on the TIMIT database and speech data collected in our laboratory (STL) in the manner described below. The baseline speaker-independent HMM phone models were trained from 325 speakers and 717 sentences from the TIMIT database. The TIMIT speech data were down-sampled from 16 KHz to 10.67 KHz. The cepstrum coefficients of Perceptually-Based Linear Prediction (PLP) analysis (8th order) (Hermansky et al. 1985) and log energy were used as instantaneous features and their 1st order 50 msec temporal regression coefficients as dynamic features. The task vocabulary size was 853, and the grammar perplexities were 104 and 105 for the TIMIT and STL test sets, respectively. The TIMIT test set had 50 males and 25 females, where each speaker spoke two to three sentences for a total of 186 sentences. The STL test set had one male (STL-m) and one female (STL-f), and each speaker read 98 TIMIT SX sentences. Compared to the TIMIT data, STL data were collected under a higher level of ambient noise (approximately 15 dB higher), and the anti-aliasing filter characteristics were also not well matched to the one used in the TIMIT database.

Recognition performances were evaluated for six cases: (a) baseline speaker-independent continuous speech recognition; (b) acoustic normalization; (c) phone model adaptation using unsupervised segmentation; (d) phone model adaptation using supervised segmentation; (e) phone model adaptation plus context modulation using unsupervised segmentation; (f) phone model adaptation plus context modulation using supervised segmentation. In cases (e) and (f), the thresholds $\eta$ and $\epsilon$ were both set to 0.3, and two methods were investigated. In the first method, the weighting factor $v_{j,i}$'s were set to unity so that only the threshold $\epsilon$ was used as a constraint. In the second method, the weighting factor $v_{j,i}$'s were determined according to Equation (19), and the threshold $\epsilon$ was also applied. For the estimation equations based on the EM algorithm, the initial parameters were speaker-independent estimates and one iteration was used for parameter estimation. As seen from Equations (4) and (11), the computation of the posterior probabilities requires the evaluation of Gaussian density likelihood for individual data samples and hence is computational expensive. Restricting one iteration for parameter estimation is therefore necessary for keeping the computation cost low. The average recognition word accuracies are summarized in Table 1 for each of the six cases. For the two STL speakers, the recognition word accuracies and error reductions (with respect to the baseline) are further illustrated in FIG. 2, where the results are averaged over the number of sentences indicated on the horizontal axis, i.e., 10 sentences, 20 sentences and so on.

As seen from the results, for the TIMIT test set, only acoustic normalization had a significant effect due to the small amount of data available from each speaker. For STL speakers, the baseline recognition word accuracies are much lower than the TIMIT set due to the mismatch of recording condition, and for which acoustic normalization produced a significant performance improvement. For speaker STL-f, phone model adaptation further improved word accuracy by a sizeable amount after acoustic normalization, and using context moaulation data led to enhanced adaptation. For speaker STL-m, positive effects of phone model adaptation become noticeable after a large number of sentences were uttered, and the effect of adaptation enhancement is small. Although a close examination of the test data by STL-f and STL-m revealed that some initial sentences contained speaking errors such as hesitations and click sounds, these sentences were counted in the recognition results.

TABLE 1

Comparison of Recognition Word Accuracy (%)
In Baseline System and Using Various Adaptation Methods

|  | TIMIT | STL-f | STL-m |
|---|---|---|---|
| Baseline | 86.9 | 67.5 | 71.1 |
| Acoustic Normalization | 88.1 | 76.7 | 86.1 |
| Phone Model Adaptation (PMA), Unsupervised | 88.1 | 80.6 | 87.6 |
| Phone Model Adaptation (PMA), Supervised | 88.3 | 81.9 | 88.2 |
| PMA + CMV, Unsupervised |  |  |  |
| Method-1 | 88.3 | 82.2 | 88.2 |
| Method-2 | — | 82.4 | 88.0 |
| PMA + CMV, Supervised |  |  |  |
| Method-1 | 88.3 | 83.0 | 88.4 |
| Method-2 | — | 84.3 | 88.9 |

From Table 1, when using supervised segmentation data for phone model adaptation, the second method of context modulation produced better results than the first one, but there is no discernible difference between the two methods when using the unsupervised segmentation data for phone model adaptation. Furthermore, Supervised segmentation produced better results than unsupervised segmentation, but the difference is not significant for the TIMIT test speakers and the speaker STL-m.

To illustrate how the Gaussian component densities are adapted from an increasing amount of adaptation data, Table 2 lists certain statistics obtained from the case (f) of method-2 for speaker STL-f. For each fixed number of sentences, the statistics include the numbers of mixture components which are directly adapted, adapted by context-modulated data, and not adapted. The percentages of interpolation parameters exceeding the threshold $\epsilon$ (using CMV) are also listed. As shown in the table, with more data becoming available, higher percentages of mixture components are directly adapted and less are adapted by context modulation data. Less than 2% of mixture components are not adapted when 30 sentences are available. Above 90% of interpolation parameters exceed the threshold $\epsilon=0.3$ (using CMV) when 80 sentences are available.

TABLE 2

The Percentages of Directly Adapted, Adapted
Via CMV, Non-Adapted Gaussian Component Densities
With Respect To The Total Number of Mixture Components

| No. of Sentences | Directly Adapted | Adapted Via CMV | Not Adapted |
|---|---|---|---|
| 10 | 4.93% | 85.40% (12.66%) | 9.67% |
| 20 | 5.17% | 85.69% (36.80%) | 9.13% |
| 30 | 5.47% | 92.71% (53.77%) | 1.82% |
| 40 | 5.88% | 92.85% (71.70%) | 1.27% |
| 50 | 6.42% | 93.20% (80.99%) | 0.38% |
| 60 | 7.50% | 92.47% (87.14%) | 0.03% |
| 70 | 8.43% | 91.55% (89.61%) | 0.03% |
| 80 | 9.67% | 90.30% (92.05%) | 0.03% |
| 90 | 11.00% | 88.97% (93.54%) | 0.03% |
| 97 | 11.92% | 88.05% (93.97%) | 0.03% |

*Note: The percentages of interpolation parameters (using CMV) which are greater than $\epsilon = 0.3$ are indicated in parenthesis It is noted from Equation (16) of mean vector adaptation that the use of context-modulation for enhancing adaptation effect has a certain similarity with the methods of interpolation by Shinoda et al. (Shinoda et al. 1991) and vector field smoothing by Ohkura et al. (Ohkura et al. 1992). The distinction is that in the current work, the individual data samples are mapped using the CMVs, and these mapped data are used to adapt both the means and covariances of the Gaussian density models; whereas the methods by Shinoda et al. and Ohkura et al. only shift the mean vectors lacking adaptation data by certain neighborhood-weighted difference vectors between the means of the adapted and original models.

Summary

The proposed technique of self-learning speaker adaptation has led to consistent performance improvements for speaker-independent continuous speech recognition. A general concern with regards to the feasibility of self-learning in the context of continuous speech recognition has been that a very poor starting model could potentially lead to divergent adaptation results. The current work demonstrates that through spectral variation source decomposition, by first removing an acoustic spectral variation source which is responsible for severly degraded recognition performance, the unsupervised segmentation errors could be significantly reduced and thus facilitate the later stage of phone model adaptation. Further research interests lie in the study of optimizing adaptation rate and convergence analysis, handling unsupervised segmentation errors, and identifying additional variation sources for adaptation.

What is claimed is:

1. A self-learning speaker adaptation method for automatic speech recognition comprising:

provit training speech from a plurality of training speakers;

transforming the training speech into a spectral domain such that each training speech utterance is represented by a sequence of training speech spectra;

building a set of Gaussian density phone models from the spectra of all training speech;

estimating a spectral bias indicative of speaker acoustic characteristics for each speech utterance using the said set of Gaussian density phone models;

normalizing the training speech spectra based on speaker acoustic characteristics using the said spectral bias;

building a plurality of Gaussian mixture density phone models having model parameters including covariance matrices and means vectors and mixture weights using the normalized training speech spectra for use in recognizing speech;

transforming a first utterance of speech into a spectral domain;

estimating a spectral bias indicative of speaker acoustic characteristics for the first utterance of speech using the said set of Gaussian density phone models;

normalizing the first utterance of speech spectra using the said spectral bias;

recognizing the normalized first utterance of speech spectra to produce a recognized word string;

segmenting the first utterance of speech spectra using said recognized word string to produce segmented adaptation data;

modifying the model parameters based on said segmented adaptation data to produce a set of adapted Gaussian mixture density phone models; and repeating and transforming, estimating, normalizing, recognizing, segmenting and modifying steps for subsequent utterances, using for each subsequent utterance the adapted Gaussian mixture density phone models produced from the previous utterance, whereby the Gaussian mixture density phone models are automatically adapted to that speaker in self-learning fashion.

2. The method of claim 1 wherein the steps of transforming the training speech and first utterance of speech into a spectral domain comprise extracting PLP cepstrum coefficients and energy indicative of phonetic features of the speech.

3. The method of claim 1 wherein the steps of transforming the training speech and first utterance of speech into a spectral domain comprise extracting first-order temporal regression coefficients for each PLP cepstrum coefficient and energy to represent dynamic features of the speech.

4. The method of claim 1 wherein the step of segmenting the first utterance of speech spectra is performed by Viterbi segmentation.

5. The method of claim 1 wherein each of said Gaussian mixture density phone models built from the spectra of all training speech is a Hidden Markov Model.

6. The method of claim 1 wherein said adapted Gaussian mixture density phone models are Hidden Markov Models.

7. The method of claim 1 wherein the step of modifying the model parameters is performed by performing context modulated upon said segmented adaptation data to produce context modulated adaptation data and by modifying the model parameters based on said context modulated adaptation data.

8. The method of claim 7 wherein said context modulation is performed by estimating relations between mixture component Gaussian densities in a mixture density and using the estimated relations to perform data mapping to augment adaptation data.

9. The method of claim 8 wherein said context modulation for mapping spectra belonging to one mixture component density to another mixture component density is further performed by:

computing a context modulation vector as the mean vector of said another mixture component density minus the mean vector of said one mixture component density; and adding the estimated context modulation vector to said spectra to obtain context-modulated spectra for said another mixture component density.

10. The method of claim 1 wherein the step of modifying the model parameters is performed by:

estimating an interpolation parameter from said segmented adaptation data for each mixture component Gaussian density, the interpolation parameter being a measure of the amount of adaptation data present in the given mixture component Gaussian density;

if said interpolation parameter is equal to or above a predetermined threshold, adapting the mixture component Gaussian density using said adaptation data;

if said interpolation parameter is below said predetermined threshold, performing context modulation on said adaptation data and adapting the mixture component Gaussian density using the context modulated adaptation data.

11. The method of claim 10 wherein said decoded first utterance is segmented using Viterbi segmentation supervised by decoded words in the first utterance.

* * * * *

UNITED STATES PATENT AND TRADEMARK OFFICE
CERTIFICATE OF CORRECTION

PATENT NO. :   5,664,059
DATED      :   September 2, 1997
INVENTOR(S) :  Yunxin Zhao It is certified that error appears in the above-identified patent and that said Letters Patent is hereby corrected as shown below:

Column 16, line 15, claim 7, "modulated" should be --modulation--

Signed and Sealed this

Tenth Day of March, 1998

Attest:

BRUCE LEHMAN

Attesting Officer

Commissioner of Patents and Trademarks